US005619115A

United States Patent [19]

Kajita

[11] Patent Number: 5,619,115

[45] Date of Patent: Apr. 8, 1997

[54] CHARGING AND DISCHARGING INTEGRATION CIRCUIT FOR ALTERNATELY CHARGING AND DISCHARGING A CAPACITOR

[75] Inventor: Yuji Kajita, Aichi-ken, Japan

[73] Assignee: Nippondenso Co., Ltd., Kariya, Japan

[21] Appl. No.: 376,917

[22] Filed: Jan. 23, 1995

[30] Foreign Application Priority Data

Jan. 21, 1994 [JP] Japan .................................... 6-022185

[51] Int. Cl.[6] .................................................. H01M 10/46

[52] U.S. Cl. ................................................................ 320/1

[58] Field of Search ........................... 320/1, 5; 323/282, 323/285, 299; 307/109

[56] References Cited

U.S. PATENT DOCUMENTS 4,746,783 5/1988 Shibuya et al. ......................... 320/1 X 5,041,776 8/1991 Shirata et al. ............................. 320/1

FOREIGN PATENT DOCUMENTS 62-17671 4/1987 Japan .

*Primary Examiner*—Edward H. Tso

*Attorney, Agent, or Firm*—Cushman Darby & Cushman Intellectual Property Group of Pillsbury Madison & Sutro, LLP

[57] ABSTRACT

A charging and discharging integration circuit packed in an IC package is disclosed. A charging current is transferred from a constant voltage source to a capacitor element through a first external terminal and a charging resistor placed outside the IC package. The capacitor element is grounded. A driving current is transferred from the constant voltage source to a current limit driving circuit through a discharging resistor placed outside the IC package through first and second external terminals. A discharging current composed of the charging current and a capacitor current flowing from the capacitor element passes a current limiting circuit through a third external terminal. The driving and discharging current are discharged to the earth through a fourth external terminal. The driving current is controlled by a comparing circuit in which a voltage of the driving current is almost equalized with a capacitor voltage of the capacitor element, so that a value of the driving current is proportional to a voltage difference between the constant voltage source and the capacitor element. The discharging current is adjusted by the current limit driving circuit in proportion to tile driving current, so that the value of the driving current is proportional to the voltage difference.

18 Claims, 9 Drawing Sheets

CHARGING AND DISCHARGING INTEGRATION CIRCUIT FOR ALTERNATELY CHARGING AND DISCHARGING A CAPACITOR p BACKGROUND OF THE INVENTION

1. Field of the Invention

The present invention relates generally to a charging and discharging integration circuit in which a capacitor is alternately charged and discharged according to input signals transferred at signal distances to sum up the signal distances in analogue technique, and more particularly to a charging and discharging integration circuit in which the signal distances are summed up with high accuracy and the number of external terminals connecting the integration circuit with external elements is reduced in cases where the charging and discharging integration circuit is manufactured as an element of an integrated circuit.

2. Description of the Prior Art

In a conventional charging and discharging integration circuit utilized for an ignition-advance control of an engine (Publication of Japanese Patent Application No. 62-17671), a capacitor of the integration circuit is alternately charged and discharged according to input signals respectively transferred in synchronization with the number of rotations of a piston or a rotor in the engine. An example of the conventional charging and discharging integration circuit is shown in FIG. 1.

2.1. First Previously Proposed Art

As shown in FIG. 1, a conventional charging and discharging integration circuit 11 is provided with a constant voltage source 12 placed in an integrated circuit (IC) package 13, a constant charging current circuit 14 placed in the IC package 13 for flowing a constant charging current, a capacitor element 15 placed outside the IC package 13 for accumulating an electric charge supplied from the constant voltage source 12 through the constant charging current circuit 14 and discharging the electric charge, a charging switch 16 placed in the IC package 13 for connecting the circuit 14 with the capacitor element 15, a constant discharging current circuit 17 placed in the IC package 13 for flowing a constant discharging current to discharge the electric charge in the capacitor element 15, a discharging switch 18 placed in the IC package 13 for connecting the capacitor element 15 with the constant discharging current circuit 17, an external charging resistor 19 placed outside the IC package 13 for adjusting the constant charging current flowing through the constant charging circuit 14, and an external discharging resistor 20 placed outside tile IC package 13 for adjusting the constant discharging current flowing through the constant discharging current circuit 17. The external charging resistor 19 is connected with an external terminal T1 of the IC package 13 and is grounded, and the external discharging resistor 20 is connected with an external terminal T2 of the IC package 13. Because values R'c, R'd of the resistors 19, 20 are precisely adjusted, it is necessary to place the resistors 19, 20 outside the IC package 13. An external element (not shown) is connected with an external terminal T3 of the IC package 13 to receive the electric charge from the constant voltage source 12, the capacitor element 15 is grounded and is connected with an external terminal T4 of the IC package 13, and the constant discharging current circuit 17 is connected with an external terminal T5 of the IC package 13 and is grounded to discharge the electric charge.

FIG. 2 is a detail circuit view of the conventional charging and discharging integration circuit 11 shown in FIG. 1.

As shown in FIG. 2, the constant voltage source 12 is provided with a resistor 21 connected to an electric source (not shown) and a zener diode 22. A constant voltage Vcc is supplied from the constant voltage source 12. The constant charging current circuit 14 is concretized by a current mirror circuit composed of a first PNP transistor 23 and a second PNP transistor 24 of which base terminals are connected to each other. A collector terminal and the base terminal in the first PNP transistor 23 is directly connected. A collector terminal of the second PNP transistor 24 is connected with the capacitor element 15 through a charging line Lc, and the external charging resistor 19 is connected to the collector terminal of the first PNP transistor 23. Because the constant charging current flowing through the charging line Lc is substantially equal to a current flowing through the external charging resistor 19, the constant charging current is adjusted by the external charging resistor 19.

The charging switch 16 is provided with a first resistor 26, a second resistor 27 and a switching NPN transistor 28 serially connected in that order between the constant voltage source 12 and the ground, and a short PNP transistor 29 of which a base terminal is connected to a line between the first and second resistors 26, 27. In cases where the switching NPN transistor 28 is set in a conducting condition by applying a positive voltage to a base terminal of the transistor 28, the base terminal of the short PNP transistor 29 is lowered, so that the short PNP transistor 29 is set in a conducting condition. Therefore, the emitter and base terminals of the second PNP transistor 24 are short-circuited, and tile constant charging current flowing through the charging line Lc is stopped. That is, the operation of the constant charging current circuit 14 is halted. In other words, the charging switch 16 is switched off.

The constant discharging current circuit 17 is concretized by a current mirror circuit composed of a first NPN transistor 30 and a second NPN transistor 31 of which base terminals are connected to each other. Collector and base terminals of the second NPN transistor 31 are directly connected. A collector terminal of the first NPN transistor 30 is connected with the capacitor element 15 through the charging line Lc, and the external discharging resistor 20 is connected to the collector terminal of the second NPN transistor 31. Because the constant discharging current flowing from the capacitor element 15 to an emitter terminal of the first NPN transistor 30 is substantially equal to a current flowing from the external discharging resistor 20, the constant discharging current is adjusted by the external discharging resistor 20.

The discharging switch 18 is concretized by a switching NPN transistor 32 of which a collector terminal is connected to the collector terminal of the second NPN transistor 31 and an emitter terminal is connected to an emitter terminal of the transistor 31. In cases where the switching NPN transistor 32 is set in a conducting condition, the emitter and base terminals of the first NPN transistor 30 are short-circuited, and the constant discharging current flowing from the transistor 30 is stopped. That is, the operation of the constant discharging current circuit 17 is halted. In other words, the discharging switch 18 is switched off.

In the above configuration of the conventional charging and discharging integration circuit 11, the operation of the charging and discharging integration circuit 11 is described with reference to FIG. 3.

In a charging period, the switching NPN transistor 28 is set in a non-conducting condition to switch on the charging switch 16, and the switching NPN transistor 32 is set in the conducting condition to switch off the discharging switch 18. In this case, a charged voltage Vc at the capacitor element 15 is linearly increased as shown in FIG. 3. In contrast, in a discharging period, the switching NPN transistor 28 is set in the conducting condition to switch off the charging switch 16, and the switching NPN transistor 32 is set in the non-conducting condition to switch on the discharging switch 18. In this case, the charged voltage Vc at the capacitor element 15 is linearly decreased as shown in FIG. 3.

For example, in cases where the capacitor element 15 set at a base capacitor voltage VO is charged at the constant charging current having a value Ic for a charging time t1 to reach a charged capacitor voltage Vc(t1), an equation (1) is obtained.

$$Vc(t1)=VO+Ic*t1/C \quad (1)$$

Here a symbol C denotes a capacitance of the capacitor element 15. Thereafter, in cases where the capacitor element 15 charged at the charged capacitor voltage Vc(t1) is discharged at the constant discharging current having a value Id for a discharging time t2 to return to the base capacitor voltage VO, an equation (2) is obtained.

$$VO=Vc(t1)-Id*t2/C \quad (2)$$

Therefore, an equation (3) is obtained from the equations (1) and (2).

$$Ic*t1=Id,t2 \quad (3)$$

Because the constant voltage Vcc is supplied from the constant voltage source 12, the values Ic, Id are expressed by equations (4), (5).

$$Ic=(Vcc-V_F)/R'c \quad (4)$$

$$Id=(Vcc-V_F)/R'd \quad (5)$$

Here a value $V_F$ is a diode drop between a base terminal and an emitter terminal in a transistor. As a result, an equation (6) is obtained from the equations (3),(4) and (5).

$$t1/t2=R'c/R'd \quad (6)$$

Therefore, a charging-discharging time ratio t1/t2 linearly relates to a resistor ratio R'c/R'd.

2.2. Second Previously Proposed Art

FIG. 4 conceptually shows another conventional charging and discharging integration circuit.

As shown in FIG. 4, another conventional charging and discharging circuit 41 is provided with the constant voltage source 12 placed in an IC package 42, first and second resistors 43, 44 arranged in series, an operational amplifier 45 of which an inverting input terminal is connected to a line between the first and second resistors 43,44 and a non-inverting input terminal is connected to a second constant voltage source 46, the capacitor element 15 connected to the inverting input terminal of the operational amplifier 45 and an output terminal of the operational amplifier 45, and a discharging switch 47 for connecting the capacitor element 15 to the constant voltage source 12 through the first resistor 43. A Miller integrating circuit is composed of the operational amplifier 45 placed in the IC package 42 and the capacitor element 15.

The first resistor 43 is connected to an external terminal T6 of the IC package 42, and a divided voltage at the line between the first and second resistors 43,44 is applied to the inverting input terminal of the operational amplifier 45 through an external terminal T7 of the IC package 42. Also, the second constant voltage source 46 is grounded through an external terminal T8 of the IC package 42, and the capacitor element 15 is connected to the output terminal of the operational amplifier 45 through an external terminal T9. Therefore, the five external terminals T3, T6, T7, T8 and T9 are used.

In the above configuration of the conventional charging and discharging integration circuit 41, in cases where the discharging switch 47 is switched off in a charging period, the operational amplifier 45 controls the divided voltage at the line between the first and second resistors 43,44 to a voltage supplied by the second constant voltage source 46. Therefore, the capacitor element 15 is charged by an output current flowing from the constant voltage source 12 through the output terminal of the operational amplifier 45, and the capacitor voltage Vc of the capacitor element is linearly increased. Thereafter, in cases where the discharging switch 47 is switched on in a discharging period, the operational amplifier 45 controls the divided voltage to the voltage supplied by the second constant voltage source 46. Therefore, the capacitor element 15 is discharged through the output terminal of the operational amplifier 45, and the capacitor voltage Vc of the capacitor element is linearly decreased.

2.3. Problems to be Solved by the Invention

However, as shown in FIG. 5, for example, the discharging period corresponds to an angle of 30 degrees for one rotation (360 degrees) of a rotor rotated at a certain rotational speed, and the charging period corresponds to a remaining angle of 330 degrees. Therefore, the charging-discharging time ratio t1/t2 higher than 10 is required, and the constant charging current Ic becomes lower than 1/10 of the constant discharging current Id. Also, the function of the constant charging current circuit 14 as a current mirror circuit is degraded as the constant charging current Ic becomes low. Also, it is required to reduce the capacitance of the capacitor element 15 for the purpose of manufacturing the conventional charging and discharging integration circuit 11 at a low cost, so that absolute values Ic and Id of the constant charging and discharging currents are undesirably reduced.

Accordingly, in cases where the capacitance of the capacitor element 15 is reduced when the charging-discharging time ratio t1/t2 is high, the constant charging current Ic is considerably decreased, and the function of the constant charging current circuit 14 as a current mirror circuit is extraordinarily degraded. Therefore, there is a drawback because the charging and discharging operation in tile conventional charging and discharging integration circuit 11 cannot be performed with high accuracy.

Also, because the capacitor element 15 in the conventional charging and discharging integration circuit 41 is not grounded, a reset circuit for discharging the electric charge of the capacitor element 15 is required in the conventional charging and discharging integration circuit 41, therefore the configuration of the conventional charging and discharging integration circuit 41 is complicated.

In addition, the five external terminals T1 to T5 (or T3, and T6 to T9) are required in the conventional charging and discharging integration circuit 11 (or 41). Therefore, in cases where the conventional charging and discharging integration circuit 11 (or 41), a calculating circuit for the ignition-advance control and a limiter circuit for preventing an excessive rotation of the rotor in the engine are, for example, packed in the IC package 13 (or 42), the number of external terminals easily reaches ten. In this case, a dual inline package is required as the IC package 13 (or 42). In contrast, assuming that the number of external terminals is nine, the conventional charging and discharging integration circuit 11 (or 41), the calculating circuit and the limiter circuit can be packed in a single inline package as the IC package 13 (or 42) to reduce an arranging space of the conventional charging and discharging integration circuit 11 (or 41).

Accordingly, another drawback in the conventional charging and discharging integration circuit 11 (or 41) is that a large arranging space of the conventional charging and discharging integration circuit 11 (or 41) is required because the dual inline package is required.

SUMMARY OF THE INVENTION

A first object of the present invention is to provide, with due consideration to the drawbacks of such a conventional charging and discharging integration circuit, a charging and discharging integration circuit in which charging and discharging characteristics are not degraded even though a value of a charging current supplied to a capacitor element is low and any complex reset circuit is not required.

Also, a second object of the present invention is to provide a charging and discharging integration circuit in which the number of external terminals is reduced.

The first object is achieved by the provision of a charging and discharging integration circuit, comprising:

- a capacitor element;
- an electric source for charging the capacitor element;
- a charging resistor arranged in a charging line between the electric source and the capacitor element;
- a current limiting circuit, arranged in a discharging line from which an electric charge of the capacitor element is discharged, for adjusting a value of a passing current according to an external signal;
- a switching circuit for exchanging the capacitor element to a discharging condition or a charging condition; and
- a current limit controlling circuit for providing the external signal to the current limiting circuit to discharge the capacitor element in a curved voltage decreasing waveform corresponding to a voltage increasing waveform of the capacitor element when charging through the charging resistor.

In the above configuration, in cases where a condition of the capacitor element is exchanged to a charging condition by the switching circuit, a charging operation is performed in a charging period. That is, electric charge supplied from the electric source is accumulated in the capacitor element through a charging line. In detail, a changeable value of a charging current is determined by the charging resistor arranged on the charging line without using any circuit such as a current mirror circuit, and the charging current is transferred to the capacitor element. In this case, because a capacitor voltage of the capacitor element is increased during the charging period, a voltage difference between both ends of the charging resistor is decreased, and the changeable value of the charging current gradually varies during the charging period. Therefore, a charging time-variation of the capacitor voltage of the capacitor element is formed in a voltage increasing waveform.

In contrast, in cases where a condition of the capacitor element is exchanged to a discharging condition by the switching circuit, a discharging operation is performed in a discharging period. That is, the electric charge accumulated in the capacitor element is discharged through a discharging line to decrease the capacitor voltage of the capacitor element. In detail, a changeable value of a discharging current flowing from the capacitor element is adjusted by the current limiting circuit arranged on the discharging line according to an external signal produced by the current limit controlling circuit. That is, a discharging time-variation of the capacitor voltage of the capacitor element is formed in a curved voltage decreasing waveform corresponding to the voltage increasing waveform of the capacitor element. Therefore, the charging and discharging integration circuit can be utilized for an ignition-advance control of an engine.

Accordingly, any current mirror circuit to be used for the charging operation is not arranged on the charging line, but the charging resistor is only arranged on the charging line. Therefore, even though the changeable value of the charging current is lowered to lengthen the charging period, there is no possibility that the changeable value of the charging current will fluctuate. In other words, the charging and discharging operation in the charging and discharging integration circuit can be performed with high accuracy even though the capacitance of the capacitor element is reduced.

It is preferred that the current controlling circuit comprises:

- a discharging resistor;
- a current limit driving circuit, connected to the discharging resistor in series and making a passing current value adjustable, for providing the external signal to the current limiting circuit; and
- a comparing circuit for controlling the passing current value of the current limit driving circuit so as to equalize a divided voltage divided by the discharging resistor and the current limit driving circuit with a voltage of the capacitor element.

In the above configuration, an electric source voltage of the electric charge supplied from the electric source is decreased to a dropped voltage of a passing current by the discharging resistor in cases where the passing current starts flowing through the current limit driving circuit according to tile external signal output frown the comparing circuit. Because a changeable value of the passing current flowing through the discharging resistor is increased as the dropped voltage of the passing current at the discharging resistor is decreased, the changeable value of the passing current is gradually increased in the discharging period. Therefore, the discharging time-variation of the capacitor voltage of the capacitor element is formed in an exponential curved shape having an upper peak in a higher voltage direction.

In contrast, because the capacitor voltage of the capacitor element is increased during the charging period, a voltage difference between both ends of the charging resistor is decreased, and the changeable value of the charging current is gradually decreased during the charging period. Therefore, the charging time-variation of the capacitor voltage of the capacitor element is formed in an exponential curved shape having an upward peak in a higher voltage direction corresponding to the exponential curved shape of the discharging time-variation.

Also, it is preferred that the current controlling circuit comprises:

- a discharging resistor; and
- a current limit driving circuit, connected to the discharging resistor in series, for providing the external signal according to a current flowing through the discharging resistor to the current limiting circuit.

In the above configuration, the external signal is provided from the current limit driving circuit to the current limiting circuit to pass a current proportional to a difference voltage between a voltage of the capacitor element and a voltage of the electric source through the current limiting circuit. Also, a value of a current flowing through the discharging resistor corresponds to the difference voltage between a voltage of the capacitor element and a voltage of the electric source. Therefore, a current discharged from the capacitor element is proportional to the difference voltage between a voltage of the capacitor element and a voltage of the electric source, and the discharging time-variation of the capacitor voltage of the capacitor element is formed in an exponential curved shape having an upper peak in a higher voltage direction.

In contrast, because the capacitor voltage of the capacitor element is increased during the charging period, a voltage difference between both ends of the charging resistor is decreased, and the changeable value of the charging current is gradually decreased during the charging period. Therefore, the charging time-variation of the capacitor voltage of the capacitor element is formed in an exponential curved shape having an upward peak in a higher voltage direction corresponding to the exponential curved shape of the discharging time-variation.

To achieve the second object, it is preferred that the current limiting circuit the switching circuit, the current limit driving circuit and the comparing circuit are packaged as a circuit unit by exposing only a plurality of external terminals, and the charging and discharging integration circuit further comprises:

a first external terminal to which a positive side of the electric source, an end of the charging resistor and an end of the discharging resistor are connected;

a second external terminal to which the other ends of the capacitor element and the charging resistor are connected;

a third external terminal to which the other end of the discharging resistor is connected; and a fourth external terminal to which a negative side of the electric source is connected.

In the above configuration, the number of external terminals required in the charging and discharging integration circuit is only four. Therefore, because the number of external terminals is reduced by one as compared with that in the conventional charging and discharging integration circuit, a single inline package can be utilized as the integrated circuit package. Therefore, an arranging space required to arrange the charging and discharging integration circuit can be considerably reduced.

The first and second objects are also achieved by the provision of a charging and discharging integration circuit in which signal intervals are integrated by exchanging a capacitor element to a charge or a discharge, the circuit unit comprising:

a first external terminal to which a positive side of the electric source and an end of the charging resistor are connected;

a second external terminal to which a discharging resistor is connected;

a third external terminal to which a capacitor element and the other end of the charging resistor are connected;

a fourth external terminal to which a negative side of an electric source is connected;

a current limiting circuit arranged between the third external terminal and the fourth external terminal for adjusting a value of a passing current according to an external signal; and a current limit controlling circuit connected to the second external terminal for providing the external signal to the current limiting circuit so as to decrease a voltage of the capacitor element in an exponential functional waveform according to a discharging resistor connected to the second external terminal.

In the above configuration, the charging and discharging integration circuit included in the circuit unit has the electric source, the charging resistor, the discharging resistor, the capacitor element, the current limiting circuit and the current limit controlling circuit.

The external signal is provided to the current limiting circuit so as to decrease a voltage of the capacitor element in an exponential functional waveform according to the discharging resistor connected to the second external terminal. Also, a capacitor voltage of the capacitor element is formed in an exponential functional waveform according to the charging capacitor. Therefore, the circuit unit including the charging and discharging integration circuit can be utilized for an ignition-advance control of an engine.

Also, any current mirror circuit to be used for a charging operation is not arranged on a charging line between the first and third external terminals, but the charging resistor is only arranged on the charging line. Therefore, even though a changeable value of the charging current is lowered to lengthen the charging period, there is no possibility that the changeable value of the charging current will fluctuate. In other words, the charging and discharging operation in the charging and discharging integration circuit can be performed with high accuracy even though the capacitance of the capacitor element is reduced.

Also, the number of external terminals required in the charging and discharging integration circuit is only four. Therefore, because the number of external terminals is reduced by one as compared with that in the conventional charging and discharging integration circuit, a single inline package can be utilized as the integrated circuit package. Therefore, an arranging space required to arrange the charging and discharging integration circuit can be considerably reduced.

BRIEF DESCRIPTION OF THE DRAWINGS

The objects, features and advantages of the present invention will be apparent from the following description taken in conjunction with the accompanying drawings, in which.

DESCRIPTION OF THE PREFERRED EMBODIMENTS

Preferred embodiments of a charging and discharging integration circuit according to the present invention are described with reference to drawings.

Figure 1:
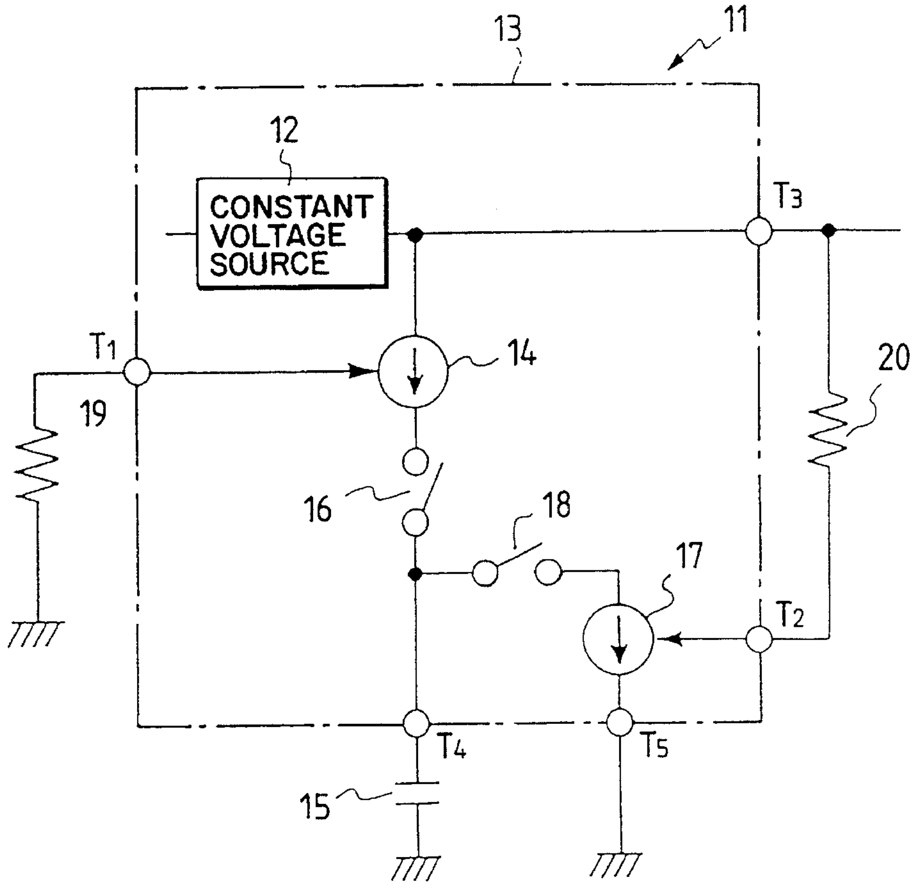
FIG. 1 PRIOR ART
FIG. 1 conceptually shows a conventional charging and discharging integration circuit.
Figure 3:
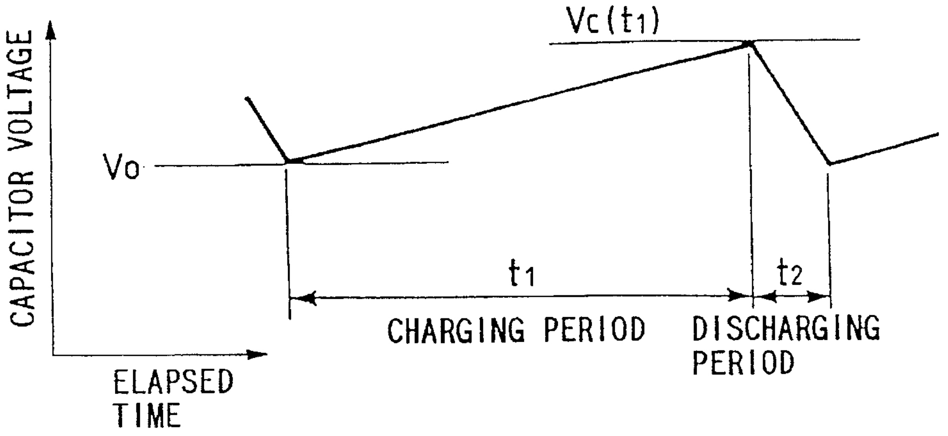
FIG. 3 PRIOR ART
FIG. 3 shows the variation of a capacitor voltage in charging and discharging periods.
Figure 2:
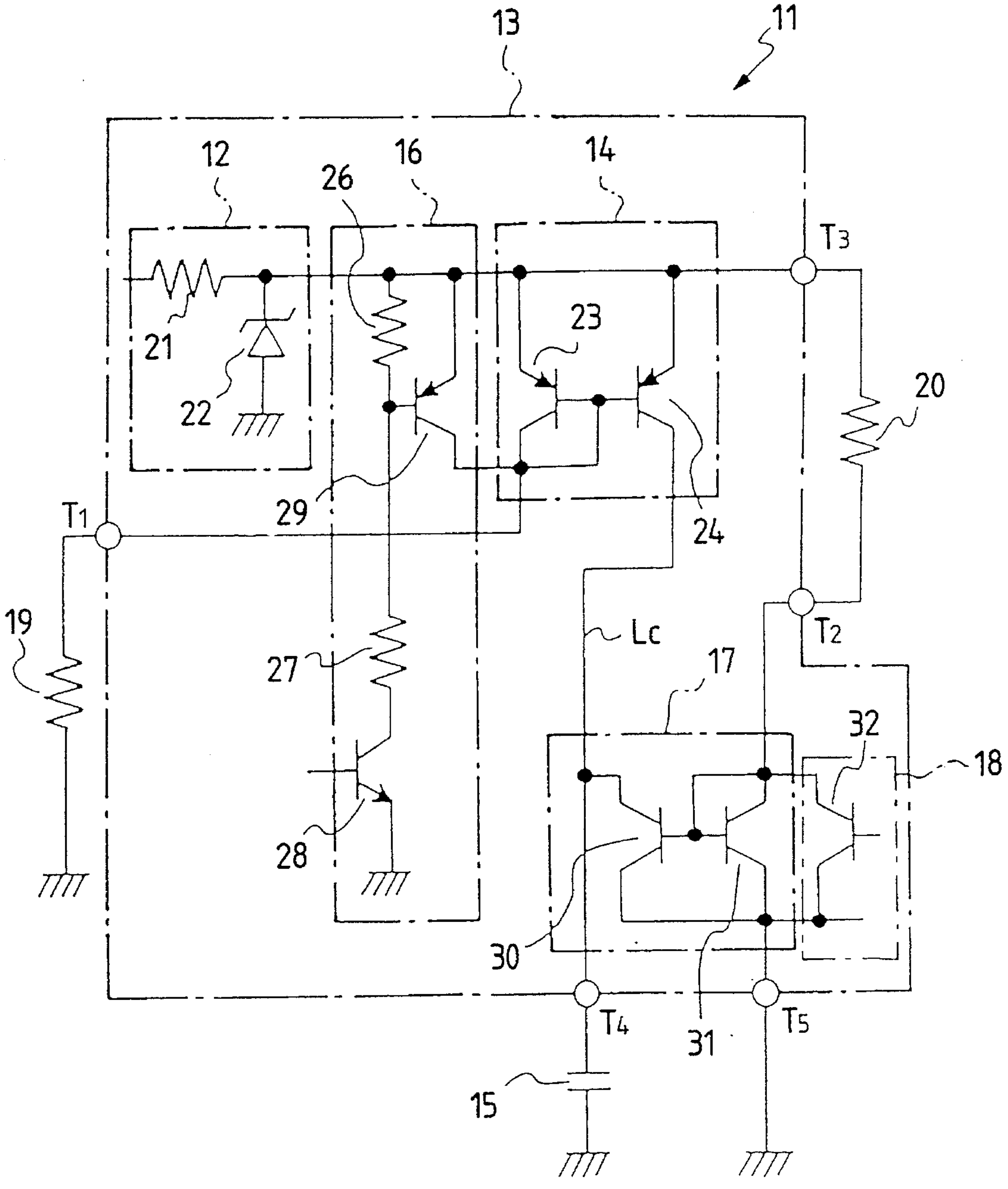
FIG. 2 PRIOR ART
FIG. 2 is a detail circuit view of the conventional charging and discharging integration circuit shown in FIG. 1.
Figure 4:
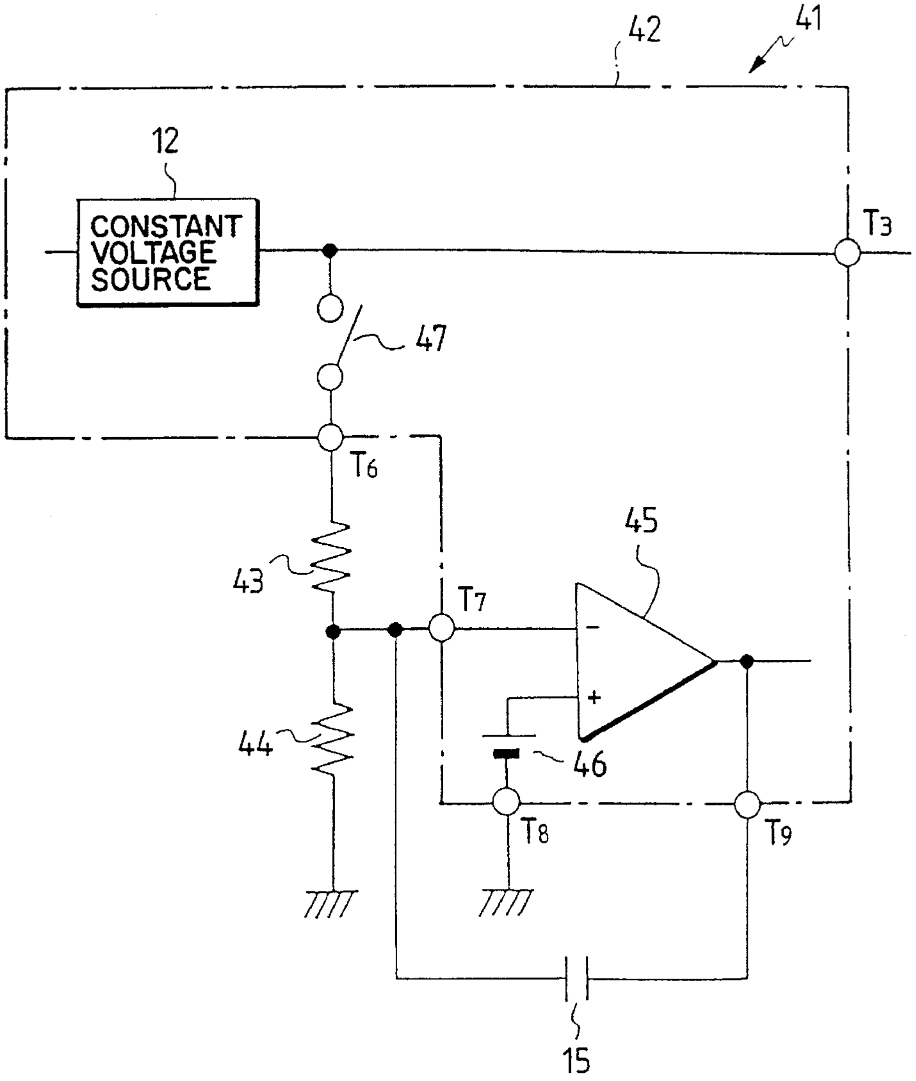
FIG. 4 PRIOR ART
FIG. 4 conceptually shows another conventional charging and discharging integration circuit.
Figure 5:
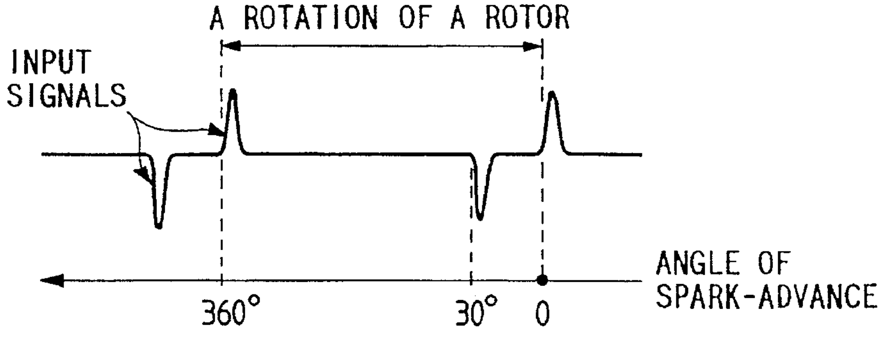
FIG. 5 PRIOR ART
FIG. 5 shows charging and discharging periods determined according to input signals.
Figure 6:
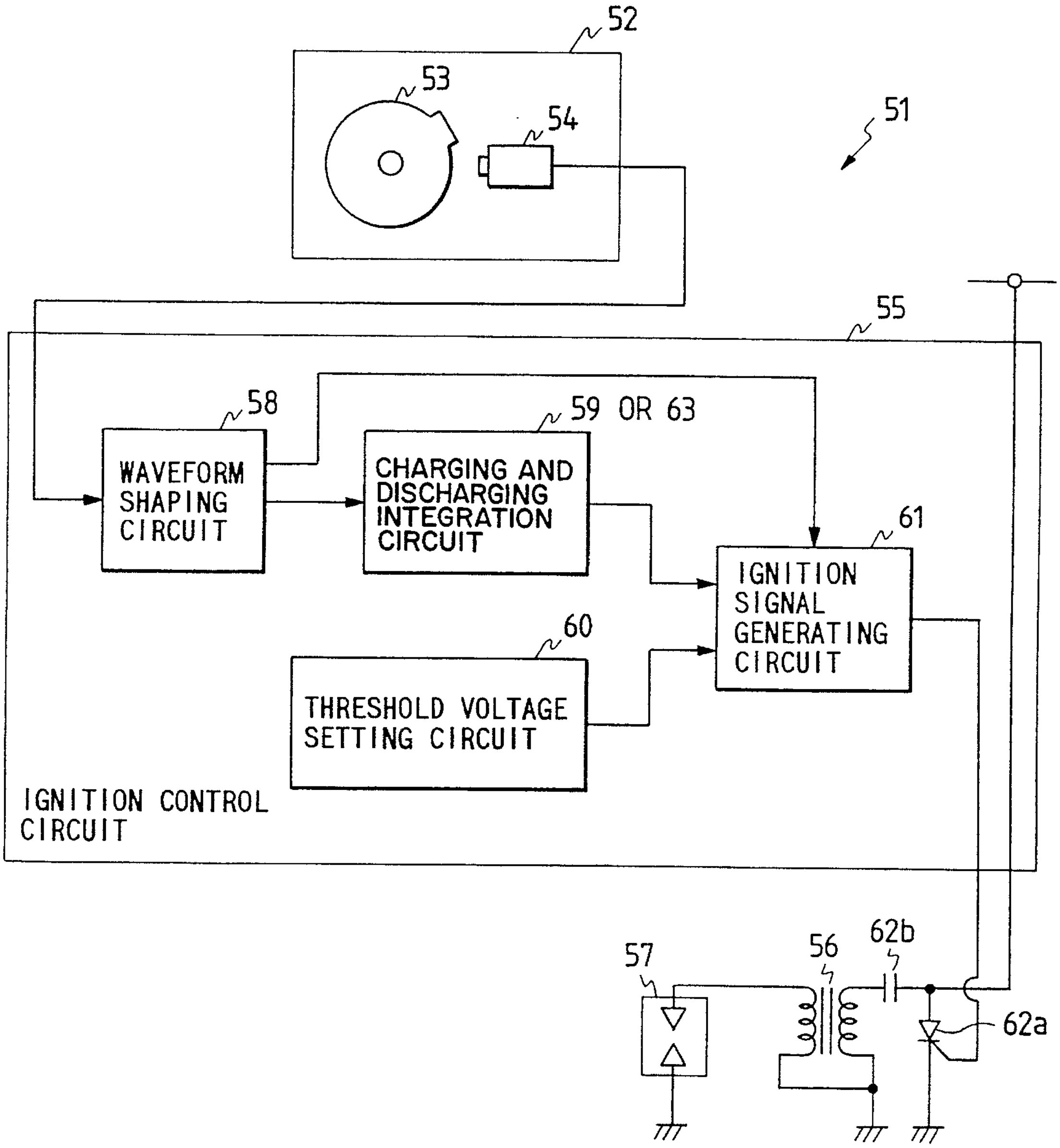
FIG. 6 is a block diagram of an ignition apparatus for an internal-combustion engine in which a charging and discharging integration circuit according to the present invention is utilized.

FIG. 6 is a block diagram of an ignition apparatus for an internal-combustion engine in which a charging and discharging integration circuit according to the present invention is utilized.

As shown in FIG. 6, an ignition apparatus 51 for an internal-combustion engine comprises a rotation angle sensor 52 for detecting a rotation angle of a rotor 53 rotated by the internal-combustion engine with an electro-magnetic pick-up 54, an ignition control circuit 55 for controlling an ignition time for the rotor 53 according to a rotational cycle of the rotor 53 detected by the electro-magnetic pick-up 54, an ignition coil 56 for generating a high electric voltage according to the ignition time controlled by the ignition control circuit 55, and an ignition plug 57 for generating a spark with the high electric voltage generated by the ignition coil 56 to rotate the rotor 53 at the ignition time controlled by the ignition control circuit 55.

In the electro-magnetic pick-up 54 of the rotation angle sensor 52, the rotation angle of the rotor 53 is detected to generate first and second pulse signals P1, P2 for each rotor rotation. The first pulse signal P1 corresponds to a maximum ignition advance position of the ignition time, and the second pulse signal P2 corresponds to a maximum ignition delay position of the ignition time.

The ignition control circuit 55 comprises a waveform shaping circuit 58 for shaping the pulse signals P1, P2, a charging and discharging integration circuit 59 or 63 for repeatedly charging and discharging a capacitor element in response to the pulse signals P1, P2 shaped by the waveform shaping circuit 58, a threshold voltage setting circuit 60 for setting a threshold voltage Vth, an ignition signal generating circuit 61 for generating an ignition signal Pi when a capacitor voltage Vc of the capacitor element discharged in the charging and discharging integration circuit 59 or 63 reaches the threshold voltage Vth set by the threshold voltage setting circuit 60 in a discharging period, and a thyristor 62*a* for discharging an ignition capacitor 62*b* when the pulse signal P1 or P2 is generated by the ignition signal generating circuit 61.

Figure 7:
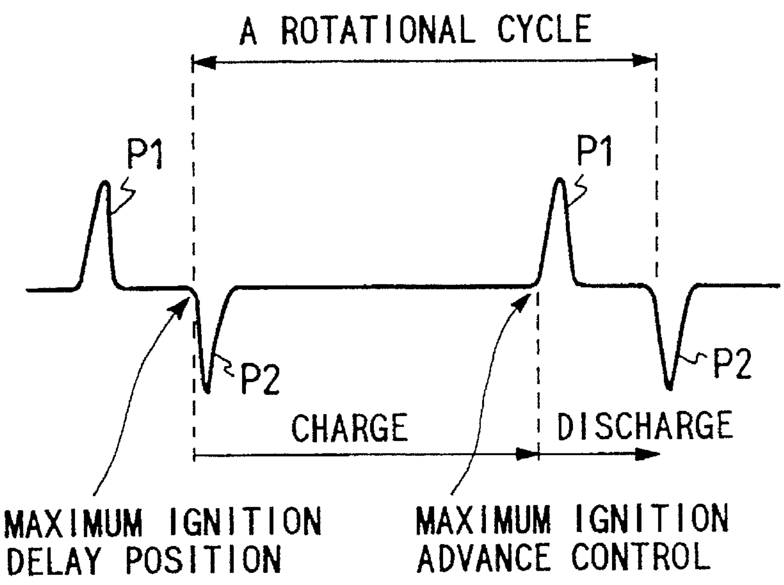
FIG. 7 shows first and second signals P1, P2 detected by an electro-magnetic pick-up shown in FIG. 6 for each rotation of a rotor.
Figure 8:
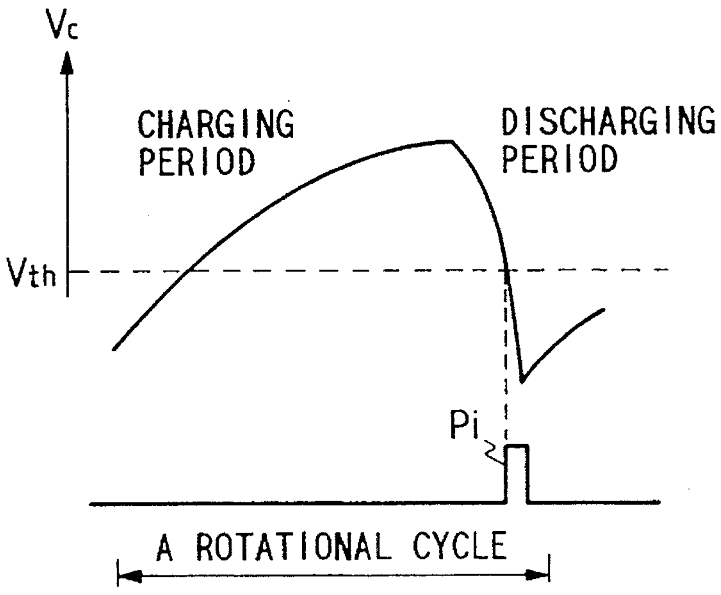
FIG. 8 shows a charging and discharging waveform of a capacitor voltage at a capacitor element of a charging and discharging integration circuit shown in FIG. 6.

In the above configuration, as shown in FIG. 7, the first and second signals P1, P2 detected by the electro-magnetic pick-up 54 are shaped by the waveform shaping circuit 58, and a capacitor element of the charging and discharging integration circuit 59 or 63 is charged in response to the second pulse signal P2 and is discharged in response to the first pulse signal P1. Therefore, as shown in FIG. 8, a capacitor voltage Vc of tile capacitor element varies to form a charging and discharging waveform according to a rotational cycle of the rotor 53. Thereafter, when the capacitor voltage Vc of the capacitor element decreased in a discharging period reaches the threshold voltage Vth, an ignition signal Pi is generated by the ignition signal generating circuit 61 to indicate an ignition time. Thereafter, a high electric voltage is generated by the ignition coil 56 in synchronization with the ignition signal Pi, and a spark is generated by applying tile high electric voltage to the ignition plug 57. Therefore, tile rotor 53 is rotated by the internal-combustion engine in which the internal combustion is performed in response to the spark.

In this case, as the rotational cycle of the rotor 53 is increased, the ignition time indicated by the ignition signal Pi is advanced as is well known. In general, it is important to obtain a degree of the ignition advance for a variation of the rotational cycle of the rotor 53 in an ignition apparatus for an internal-combustion engine. Therefore, it is important to obtain the linearity of the capacitor voltage Vc to the rotational cycle of the rotor 53. In the present invention, the charging and discharging integration circuit 59 or 63 is provided on condition that the linearity of the capacitor voltage Vc to the rotational cycle of the rotor 53 is obtained.

Next, the charging and discharging integration circuit 59 is described according to a first embodiment of the present invention.

Figure 9:
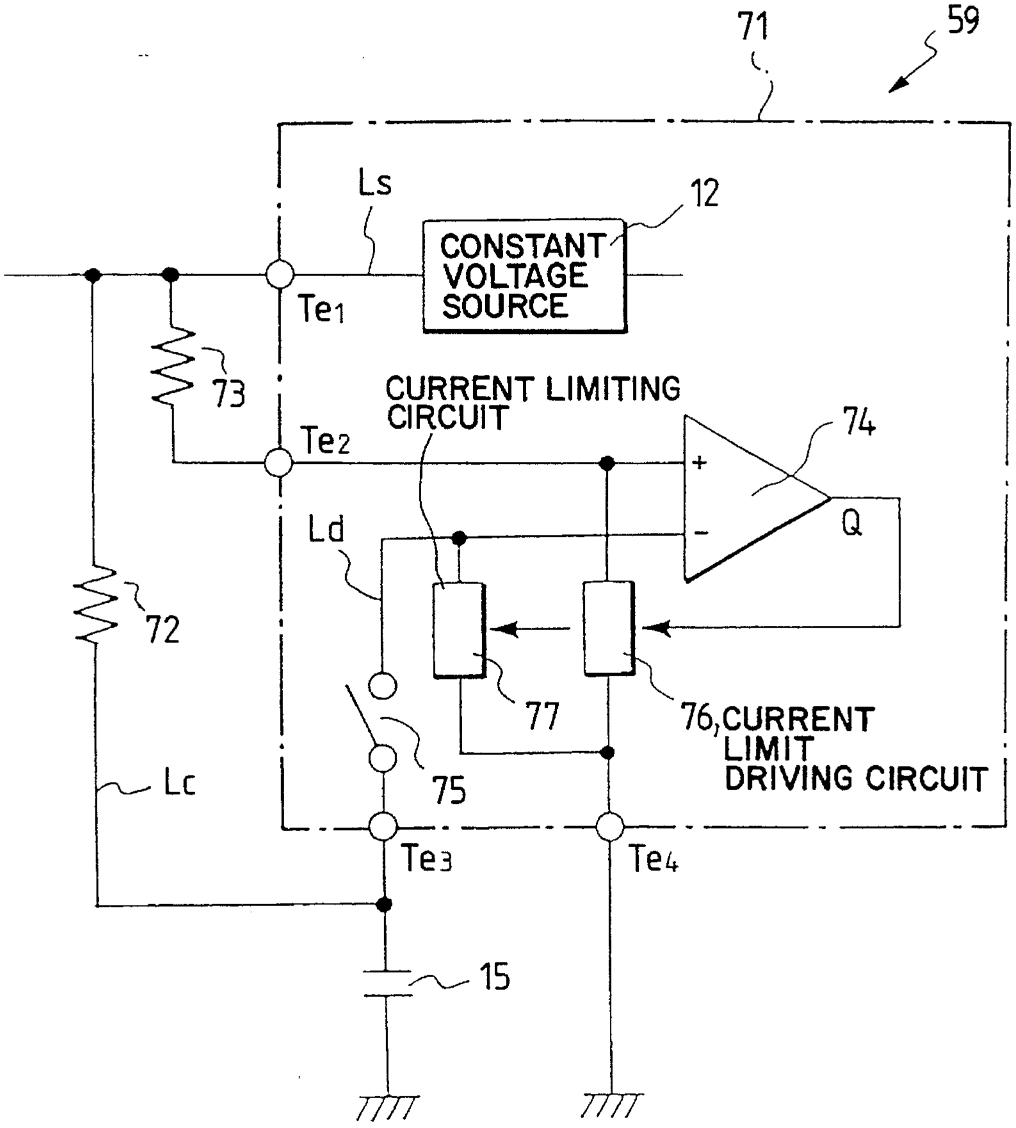
FIG. 9 conceptually shows a charging and discharging integration circuit shown in FIG. 6 according to a first embodiment of the present invention.

FIG. 9 conceptually shows the charging and discharging integration circuit 59 according to a first embodiment of the present invention. The charging and discharging integration circuit 59 is concretized by a double integral circuit.

As shown in FIG. 9, the charging and discharging integration circuit 59 comprises the constant voltage source 12, the capacitor element 15 of which one end is grounded, a charging resistor 72 placed on a charging line Lc for determining a changeable value of a charging current which is supplied from the constant voltage source 12 to the capacitor element 15 through an electric source line Ls to increase a capacitor voltage Vc of tile capacitor element 15, a discharging resistor 73 for passing a driving current supplied from the constant voltage source 12 through the electric source line Ls and dropping the constant voltage Vcc of the driving current to set the driving current to a dropped voltage Vd, a comparing circuit 74 functioning as an operational amplifier for receiving the dropped voltage Vd set by the discharging resistor 73 at its non-inverting input terminal (+), receiving a capacitor voltage Vc of the capacitor element 15 at its inverting input terminal (–) through a discharging switch 75, comparing the dropped voltage Vd of the driving current and the capacitor voltage Vc of the capacitor element 15, and outputting an output voltage from its output terminal as a comparing signal indicating a difference between the dropped voltage Vd and the capacitor voltage Vc in cases where the discharging switch 75 is switched on in a discharging period, a current limit driving circuit 76 connected to the discharging resistor 73 in series for adjusting a changeable value of the driving current passing through the discharging resistor 73 according to the output current supplied from the output terminal of the comparing circuit 74 to almost equalize the dropped voltage Vd of the driving current and the capacitor voltage Vc of the capacitor element, and producing an external signal, and a current limiting circuit 77 arranged on a discharging line Ld for adjusting a changeable value of a discharging current, which is composed of a capacitor current flowing from the capacitor element 15 and the charging current flowing through the charging line Lc, according to the external signal produced by the current limit driving circuit 76 in the discharging period to set the changeable value of the discharging current to a value proportional to the changeable value of the driving current, and discharging the electric charge accumulated in the capacitor element 15 to the ground through the discharging line Ld.

A combined unit composed of the discharging resistor 73, the comparing circuit 74 and the current limit driving circuit 76 functions as a current controlling circuit for controlling the discharging current passing through the current limiting circuit 77.

The constant voltage source 12, the comparing circuit 74, the current limit driving circuit 76 and the current limiting circuit 77 are placed in an integrated circuit (IC) package 71, and the charging resistor 72, the discharging resistor 73 and the capacitor element 15 are placed outside the IC package 71. The resistors 72 and 73 are connected to the constant voltage source 12 through an external terminal Te1 of the IC package 71, the discharging resistor 73 is connected to the non-inverting input terminal (+) of the comparing circuit 74 through an external terminal Te2 of the IC package 71, the capacitor element 15 is connected to the inverting input terminal (–) of the comparing circuit 74 through an external terminal Te3 of the IC package 71, and the currents passing the circuits 76 and 77 are discharged to the ground through an external terminal Te4 of the IC package 71. A changeable value of the charging current passing the charging line Lc is proportional to a difference between a constant voltage of the constant voltage source 12 and a capacitor voltage of the capacitor element 15.

Figure 10:
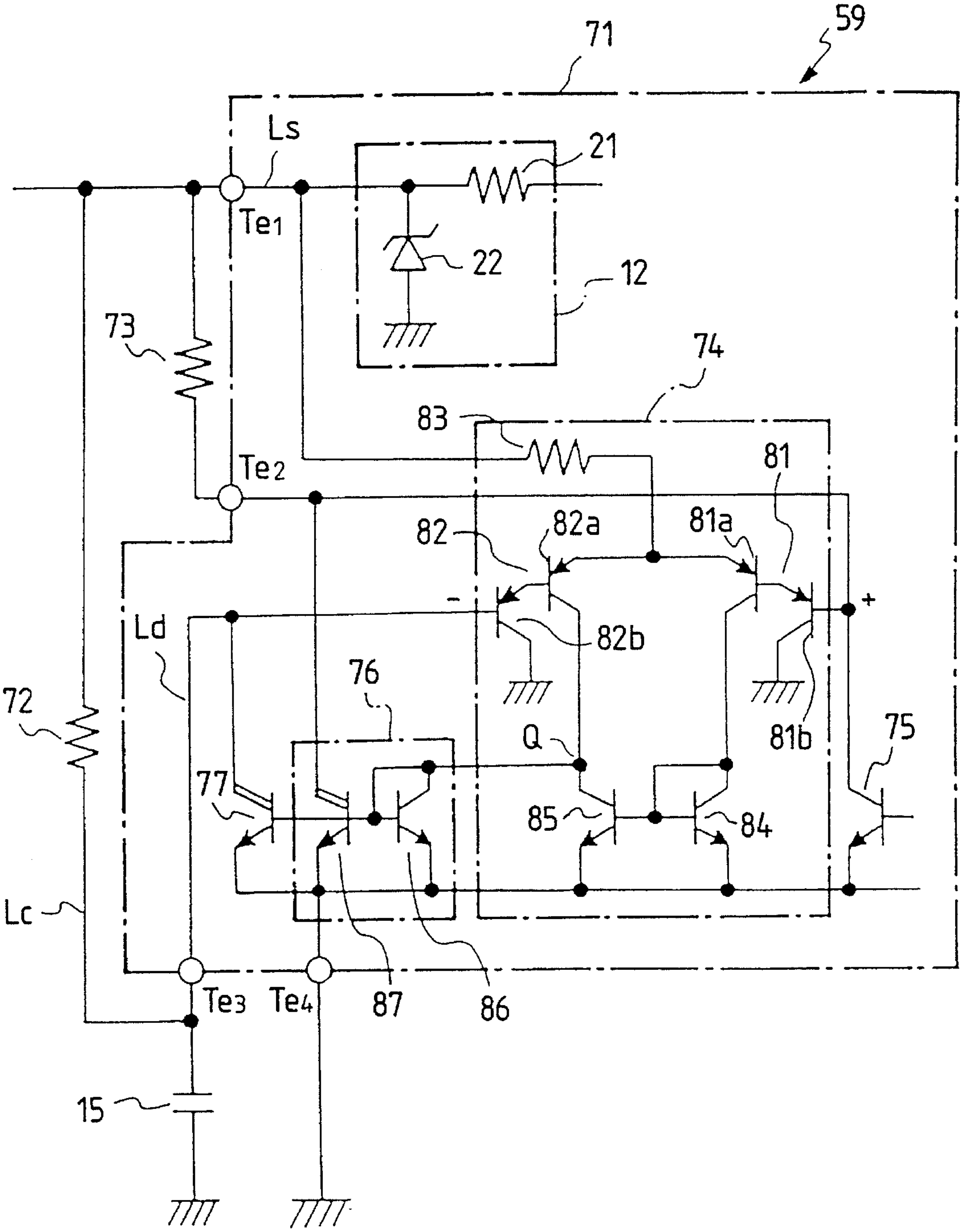
FIG. 10 is a detail circuit view of the charging and discharging integration circuit shown in FIG. 9.

FIG. 10 is a detail circuit view of the charging and discharging integration circuit 59 shown in FIG. 9.

As shown in FIG. 10, the comparing circuit 74 comprises a first transistor circuit 81, composed of transistors 81*a* and 81*b*, of which a base terminal corresponds to the non-inverting input terminal (+), a second transistor circuit 82, composed of transistors 82*a* and 82*b*, of which a base terminal corresponds to the inverting input terminal (–), a resistor 83 placed at a line between the constant voltage source 12 and emitter terminals of the transistor circuits 81, 82, a first NPN transistor 84 of which a collector terminal is connected to a collector terminal of the first transistor circuit 81 and an emitter terminal is grounded through the external terminal Te4, and a second NPN transistor 85 of which a collector terminal is connected to a collector terminal of the second transistor circuit 82 and an emitter terminal is grounded through the external terminal Te4. The collector and base terminals of the first NPN transistor 84 are short-circuited, and a combined unit of the first and second NPN transistors 84, 85 of which base terminals are connected to each other functions as a current mirror circuit. An output terminal Q of the comparing circuit 74 is placed at the collector terminal of the second NPN transistor 85.

The discharging switch 75 is concretized by a third NPN transistor 75 of which a collector terminal is connected to the non-inverting input terminal (+) of the comparing circuit 74 and the discharging resistor 73 and an emitter terminal is grounded through the external terminal Te4.

The current limit driving circuit 76 is concretized by fourth and fifth NPN transistors 86, 87 of which base terminals are connected to each other. The output terminal Q of the comparing circuit 74 is connected to a collector terminal of the fourth NPN transistor 86 and the base terminals of the transistors 86, 87. A combined unit of the NPN transistors 86, 87 functions as a current mirror circuit in which a value of a current flowing from the fifth NPN transistor 87 is a predetermined number of times larger than a value of current flowing from the fourth NPN transistor 86. In cases where an external signal transferred from the output terminal Q of the comparing circuit 74 is received in the current limit driving circuit 76, the NPN transistors 86, 87 are set in a conducting condition, and a driving current flows through the discharging resistor 73 and tile fifth NPN transistor 87. A changeable value of the driving current is proportional to that of an output current flowing from the output terminal Q as the external signal.

The current limiting circuit 77 is concretized by a sixth NPN transistor 77 of which a base terminal is connected to the base terminals of the NPN transistors 86, 87. In cases where the NPN transistors 86, 87 are set in the conducting condition, the sixth NPN transistor 77 is also set in the conducting condition in the same degree as that of the fifth NPN transistor 87, and a discharging current flows from the capacitor element 15 to the ground through the sixth NPN transistor 77. A changeable value of the discharging current is proportional to that of the driving current flowing through the fifth NPN transistor 87.

Figure 11:
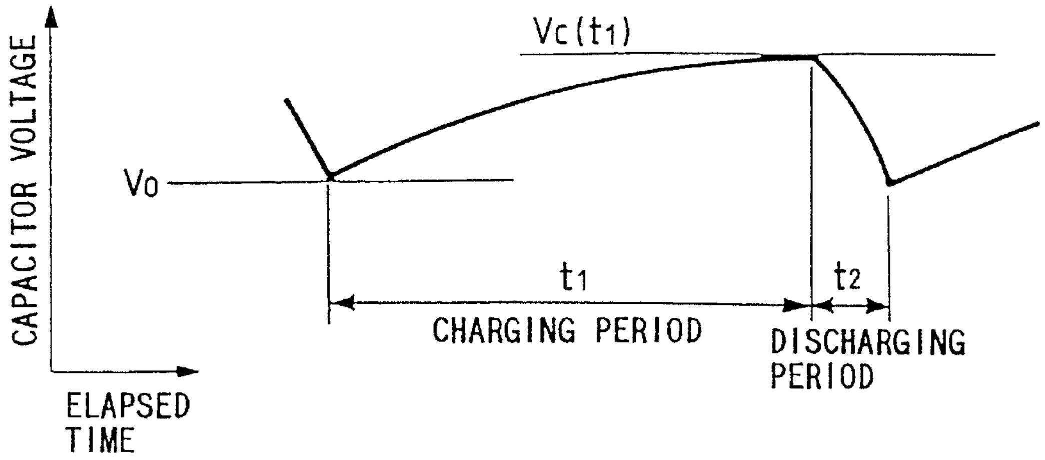
FIG. 11 shows a time-variation of a capacitor voltage at a capacitor element shown in FIG. 10, the capacitor voltage being formed in an exponential curve shape having an upward peak.

In the above configuration of the charging and discharging integration circuit 59, in cases where a charging period is started in response to the second pulse signal P2, the third NPN transistor 75 is set in a conducting condition. That is, the discharging switch 75 is switched off. In this case, a current flows from the constant voltage source 12 to the ground through the discharging resistor 73 and the third NPN transistor 75, an applied voltage at the non-inverting input terminal (+) of the comparing circuit 74 is lowered, and no output current is supplied from the output terminal Q of the comparing circuit 74 to the current limit driving circuit 76. Therefore, the fourth, fifth and sixth NPN transistors 86, 87 and 77 are set in a non-conducting condition, and a charging current flows from the constant voltage source 12 to the capacitor element 15 through the charging resistor 72 to charge the capacitor element 15 without discharging the discharging current to the ground through the sixth NPN transistor 77. In this case, because a capacitor voltage Vc of the capacitor element 15 is gradually increased by the charging current, as shown in FIG. 11, an increasing degree of the capacitor voltage Vc is gradually reduced in the charging period to form a charging time-variation of the capacitor voltage Vc in an exponential curve shape having an upward peak.

The charging time-variation of the capacitor voltage Vc is expressed according to an equation (7).

$$(Vcc-Vc)/Rc=C*dVc/dt \qquad (7)$$

Here the value Vcc is the constant voltage of the constant voltage source 12, the symbol Rc denotes a resistance value of the charging resistor 72, the symbol Vc denotes a charging voltage of the capacitor element 15, and the symbol C denotes a capacitance of the capacitor element 15. Therefore, in cases where the capacitor element 15 having an initial charging voltage $V_o$=Vc(O) is charged for a prescribed charging time t1, a charging voltage of the capacitor element 15 reaches Vc(t1) expressed according to an equation (8).

$$Vc(t1)=Vcc*[1-(1-V_o/Vcc)*\exp\{-t1/(Rc*C)\}] \qquad (8)$$

In contrast, in cases where a discharging period is started in response to the first pulse signal P1, the third NPN transistor 75 is set in a non-conducting condition. That is, the discharging switch 75 is switched on. In this case, a first changeable voltage which is initially set to the constant voltage Vcc of the constant voltage source 12 is applied to the non-inverting input terminal (+) of the comparing circuit 74. Therefore, the constant voltage Vcc applied to the non-inverting input terminal (+) of the comparing circuit 74 becomes higher than the capacitor voltage Vc of the capacitor element 15 applied to the inverting input terminal (–) of the comparing circuit 74, and the comparing circuit 74 is operated. In detail, a current flowing from the resistor 83 flows into the second transistor circuit 82 as a second collector current. Because a voltage applied to the non-inverting input terminal (+) is higher than that applied to the inverting input terminal (–), the second collector current is higher than a first collector current flowing through the first transistor circuit 81. Also, because a combined unit of the first and second NPN transistors 84, 85 functions as a current mirror circuit, a value of a current flowing through the first NPN transistor 84 is the same as that flowing through the second NPN transistor 85. Therefore, an output current having a changeable value which agrees with a difference between values of tile first and second collector currents flows from the output terminal Q of the comparing circuit 74 to the current limit driving circuit 76, and the NPN transistors 86,87 and 77 are set in the conducting condition. Thereafter, the output current flows through the fourth NPN transistor 86 to the ground, a driving current of which a changeable value is a predetermined number of times times higher than the value of the output current flowing through the discharging resistor 73 and the fifth NPN transistor 87 to the ground, and a discharging current of which a changeable value is proportional to that of the discharging current flowing through the sixth NPN transistor 77 to the ground. The discharging current is composed of the charging current flowing through the charging resistor 72 and a capacitor current flowing from the capacitor element 15. Therefore, the capacitor voltage Vc of the capacitor element 15 is gradually decreased, and the first changeable voltage applied to the non-inverting input terminal (+) of the comparing circuit 74 is decreased because the constant voltage Vcc of the constant voltage source 12 is dropped by the discharging resistor 73 according to the flow of the driving current.

In this case, because the first changeable voltage is decreased, a dropped voltage at the discharging resistor 73 is gradually increased, and the driving current is increased because of the increase of the dropped voltage. That is, the discharging current proportional to the driving current is increased until the first changeable voltage applied to the non-inverting input terminal (+) of the comparing circuit 74 becomes equal to the capacitor voltage applied to the inverting input terminal (–) of the comparing circuit 74. The increase of the discharging current in the discharging period is mathematically described as follows on condition that a changeable value of the discharging current is equal to that of the driving current for convenience.

Because a value of the output voltage supplied to the current limit driving circuit 76 is proportional to a voltage difference ΔV (ΔV>0) between the first changeable voltage Vc+ΔV applied to the non-inverting input terminal (+) and the capacitor voltage Vc applied to the inverting input terminal (–), a changeable value Id of tile discharging current is proportional to the voltage difference ΔV.

$$Id=\Delta V*k \quad (9)$$

Here the symbol k denotes a constant.

Because the changeable value Id is equal to that of the driving current flowing through the discharging resistor 73, the changeable value Id is also expressed according to an equation (10).

$$Id=(Vcc-Vc-\Delta V)/Rd \quad (10)$$

Here the value Vcc-Vc-ΔV denotes the dropped voltage at the discharging resistor 73, and the symbol Rd denotes a resistance value of the discharging resistor 73.

Therefore, the voltage difference ΔV is expressed according to an equation (11) by eliminating the changeable value Id from the equations (9) and (10).

$$\Delta V=(Vcc-Vc)/(k*Rd+1) \quad (11)$$

Therefore, the changeable value Id of the discharging current is expressed according to an equation (12) by substituting the equation (11) into the equation (10).

$$Id=\{(Vcc-Vc)-(Vcc-Vc)/(k*Rd+1)\}/Rd \quad (12)$$

In cases where tile value Rd is, for example, set to satisfy the value k*Rd=100, the influence of the voltage difference ΔV on the discharging current is negligible. Therefore, an equation (13) is obtained.

$$Id\sim(Vcc-Vc)/Rd \quad (13)$$

The changeable value Id of the discharging current is increased in proportion to a difference Vcc–Vc in voltage between the constant voltage source 12 and the capacitor element 15, and the changeable value Id is determined according to a proportional constant Rd.

Accordingly, the discharging current is increased as the capacitor voltage Vc of the capacitor element 15 is decreased. In other words, the increase of the discharging current is accelerated in the discharging period, and the decrease of the capacitor voltage Vc is accelerated in the discharging period. Therefore, as shown in FIG. 11, a discharging time-variation of the capacitor voltage Vc is formed in another exponential curve shape having an upward peak.

On condition that the changeable value Id of the discharging current is equal to that of the driving current for convenience, the discharging time-variation of the capacitor voltage Vc is expressed according to equations (13) to (15).

$$Ic=(Vcc-Vc)/Rc \quad (14)$$

$$\begin{aligned} Ic-Id &= (Vcc-Vc)/Rc-(Vcc-Vc)/Rd \\ &= C*dVc/dt \end{aligned} \quad (15)$$

Here the symbol Ic denotes the charging current.

After the capacitor element 15 having the charging voltage Vc(t1) is discharged for a prescribed discharging time t2, in cases where the charging voltage returns to the initial voltage $V_o$, the relationship between the charging time t1 and the discharging time t2 is expressed according to an equation (16).

$$V_o=Vcc*[1-\{1-Vc(t1)/Vcc\}*\exp\{(Rc-Rd)*t2/(Rc*Rd*C)\}] \quad (16)$$

Thereafter, an equation (17) is obtained by rearranging the equations (8) and (16).

$$t1/t2=Rc/Rd-1 \quad (17)$$

Therefore, the linearity of a charging-discharging time ratio t1/t2 to a resistance ratio Rc/Rd is maintained in the same manner as that in the conventional charging and discharging integration circuit 11. Because the discharging operation is performed while charging the capacitor element 15 at the charging current Ic, the term −1 is added in the equation (17).

Accordingly, any current mirror circuit used for the charging operation is not arranged on tile charging line Lc, but the charging resistor 72 is only arranged on the charging line Lc. Therefore, even though the changeable value Ic of the charging current is lowered to lengthen the charging time t1, there is no possibility that the changeable value Ic of the charging current will fluctuate. In other words, the charging and discharging operation in the charging and discharging integration circuit 59 can be performed with high accuracy even though the capacitance C of the capacitor element 15 is reduced on condition that the charging-discharging time ratio t1/t2 is high.

Also, because one end of the capacitor element 15 is grounded, the capacitor element 15 can be reset by a simple reset circuit (not shown) in which a short circuit is provided.

Also, because the number of external terminals in the charging and discharging integration circuit 59 is only four, even though a dual inline package is required as an IC package in the conventional charging and discharging integration circuit 11 or 41, a single inline package can be utilized as the IC package 71. Therefore, an arranging space required to arrange the charging and discharging integration circuit 59 can be considerably reduced.

In the first embodiment, constant current flows through the resistor 83. However, a constant current source can be used in place of the resistor 83. Also, a constant current source can be additionally arranged at both the emitter side of the first transistor circuit 81 and the emitter side of the second transistor circuit 82. Also, in cases where the fluctuation of voltage at the external terminal Te2 occurs when an operational speed of the comparing circuit 74 is heightened, it is preferred that a capacitor having a low capacitance be additionally arranged between the external terminals Te2 and Te3 or between the external terminals Te2 and Te4 to prevent the occurrence of the voltage fluctuation.

Next, a second embodiment according to the present invention is described.

Figure 12:
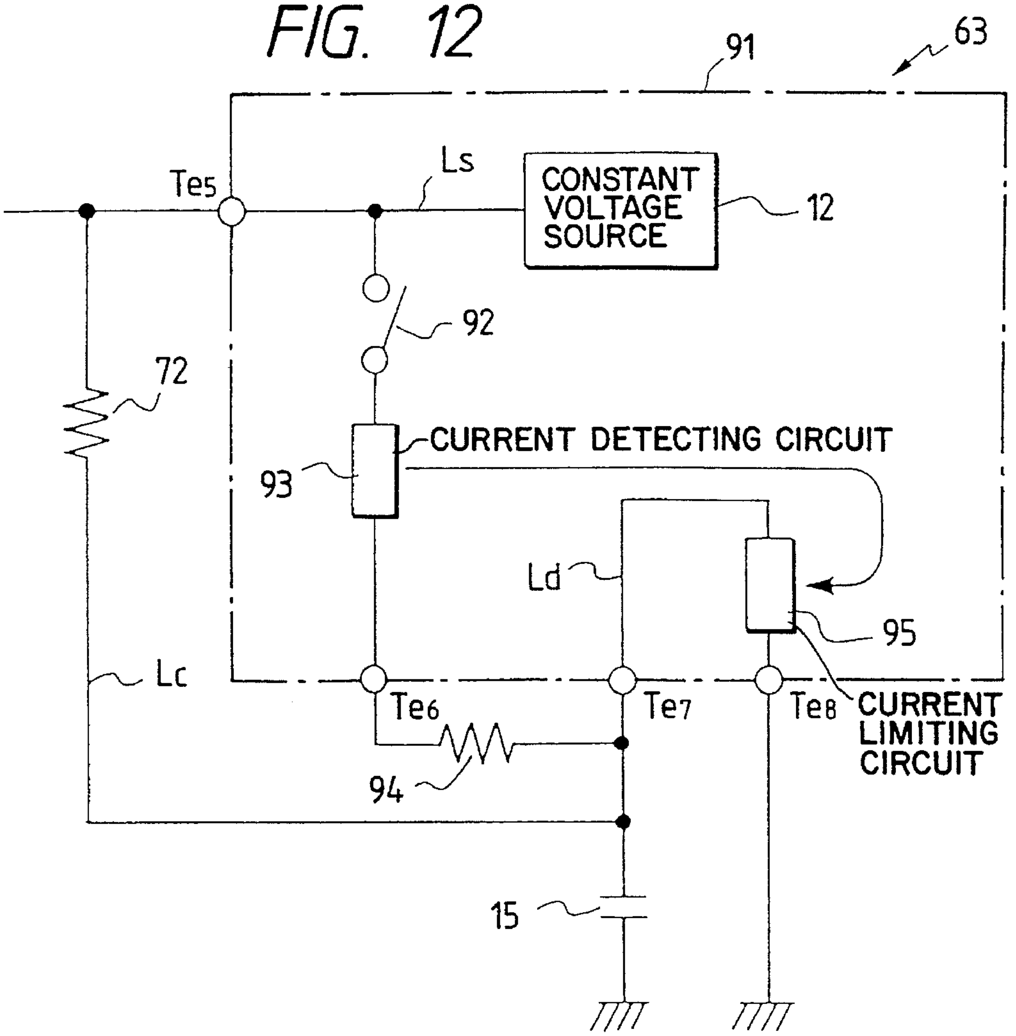
FIG. 12 conceptually shows a charging and discharging integration circuit shown in FIG. 6 according to a second embodiment of the present invention.

FIG. 12 conceptually shows the charging and discharging integration circuit 63 according to a second embodiment of the present invention. The charging and discharging integration circuit 63 is concretized by a double integral circuit.

As shown in FIG. 12, the charging and discharging integration circuit 63 comprises the constant voltage source 12, the capacitor element 15 of which one end is grounded, the charging resistor 72 placed on a charging line Lc for passing a charging current which is supplied from the constant voltage source 12 to the capacitor element 15 through an electric source line Ls, a discharging switch 92 which is switched on in a discharging period and is switched off in a charging period, a current detecting circuit 93 for detecting a current flowing through a discharging resistor 94 in the discharging period, the discharging resistor 94 for passing a controlled current having a changeable value $(Vcc-V_F-Vc)/Rd$ in the discharging period, and a current limiting circuit 95 for passing a discharging current composed of the controlled current passing through the discharging resistor 94, a charging current passing through the charging resistor 72 and a capacitor current discharged from the capacitor element 15 according to an external signal provided from the current detecting circuit 93.

A combined unit composed of the current detecting circuit 93 and the discharging resistor 94 functions as a current controlling circuit for controlling the discharging current passing through the current limiting circuit 95.

The constant voltage source 12, the discharging resistor 92, the current detecting circuit 93 and the current limiting circuit 95 are placed in an integrated circuit (IC) package 91. One end of the charging resistor 72 is connected to the constant voltage source 12 through an external terminal Te5 of the IC package 91. One end of the discharging resistor 94 is connected to the current detecting circuit 93 through an external terminal Te6 of the IC package 91. The other end of the charging resistor 72 and the discharging resistor 94 and the capacitor element 15 are connected to the current limiting circuit 95 through an external terminal Te7 of the IC package 91, and the discharging current is discharged to the ground through an external terminal Te8 of the IC package 91. Therefore, the number of external terminals is four.

Figure 13:
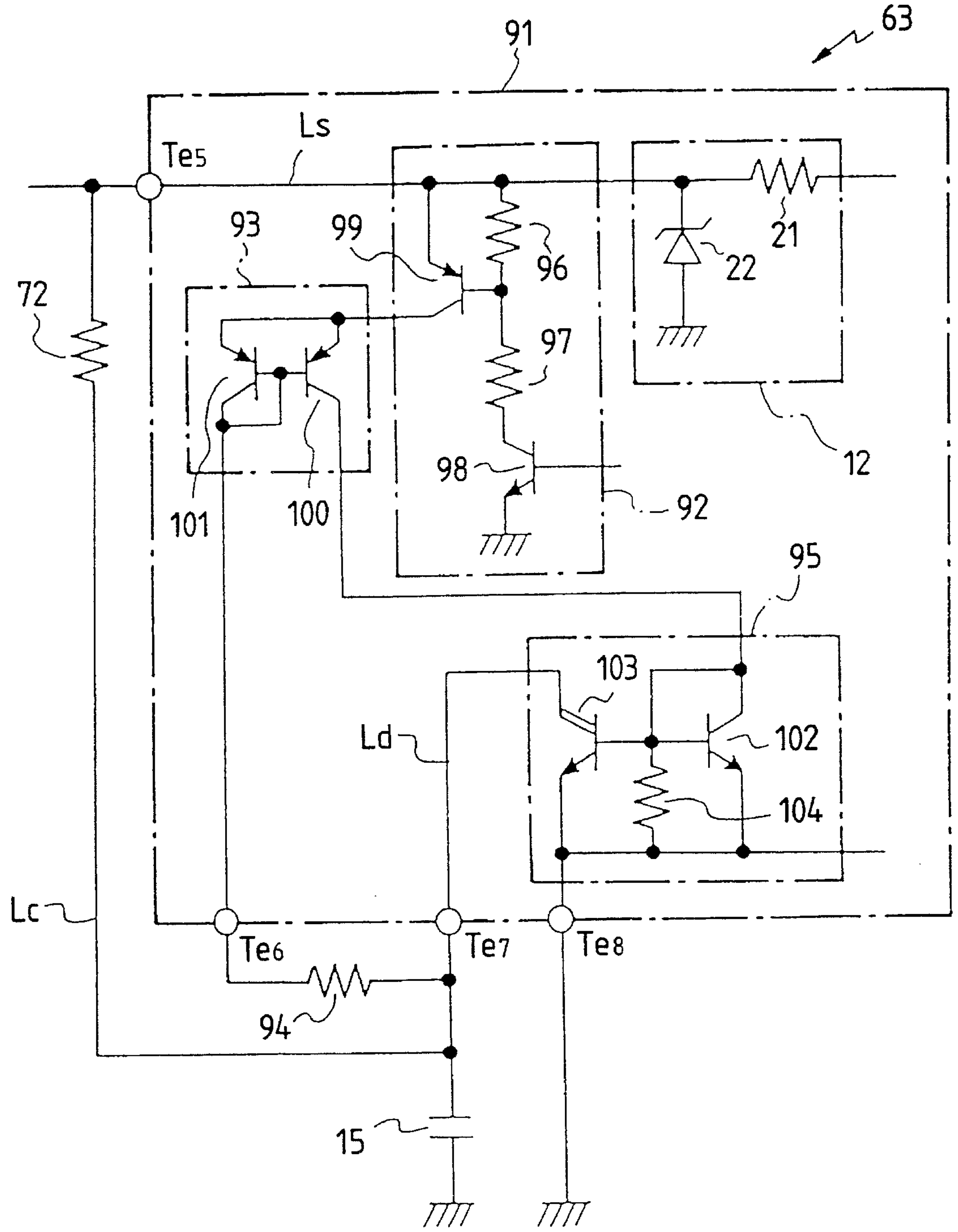
FIG. 13 is a detail circuit view of the charging and discharging integration circuit shown in FIG. 12.

FIG. 13 is a detail circuit view of the charging and discharging circuit 63 shown in FIG. 12.

As shown in FIG. 13, the discharging switch 92 comprises a first resistor 96, a second resistor 97 and a switching NPN transistor 98 serially connected in that order between the constant voltage source 12 and the ground, and a first PNP transistor 99 of which a base terminal is connected to a line between the first and second resistors 96,97. In cases where the switching NPN transistor 98 is set in a conducting condition by applying a positive voltage to a base terminal of the switching NPN transistor 98, a voltage Vcc applied to the base terminal of the first PNP transistor 99 is lowered, so that the first PNP transistor 99 is set in a conducting condition. Therefore, a current flowing through tile first PNP transistor 99 is transferred to tile current detecting circuit 93. In other words, the discharging switch 92 is switched on.

The current detecting circuit 93 comprises a second PNP transistor 100 and a third PNP transistor 101 of which base terminals are connected to each other. The base and collector terminals of the third PNP transistor 101 are short-circuited and are connected to the discharging resistor 94, and emitter terminals of the PNP transistors 100, 101 are connected to the collector terminal of the first PNP transistor 99. Therefore, a combined unit of the PNP transistors 100, 101 functions as a current mirror circuit, and a value of a current flowing through the second PNP transistor 100 is the same as that flowing through the third PNP transistor 101.

The current limiting circuit 95 comprises a first NPN transistor 102, a second NPN transistor 103 having a size twice larger than the first NPN transistor 102, and a resistor 104. Base terminals of the NPN transistors 102, 103 and one end of the resistor 104 are connected to each other, and the collector and base terminals of the first NPN transistor 102 are short-circuited. Therefore, a combined unit of the NPN transistors 102, 103 functions as a current mirror circuit, and a changeable value of a discharging current flowing through the second NPN transistor 103 is twice as much as a signal current flowing through the first NPN transistor 102. The signal current passing through the second PNP transistor 100 flows through the first NPN transistor 102, and the discharging current having a changeable value twice larger than the signal current flows through the second NPN transistor 103.

In the above configuration of the charging and discharging integration circuit 63, in cases where a charging period is started in response to the second pulse signal P2, the switching NPN transistor 98 is set in a non-conducting condition. That is, the discharging switch 92 is switched off. In this case, the first PNP transistor 99 is set in a non-conducting condition, and no current flows through the current detecting circuit 93. Therefore, no current flows through the current limiting circuit 95, and a charging current flows through a source line Ls and a charging line Lc while passing through the charging resistor 72. Therefore, the capacitor element 15 is charged in the same manner as in the first embodiment.

In contrast, in cases where a discharging period is started in response to the first pulse signal P1, the switching NPN transistor 98 is set in a conducting condition. That is, the discharging switch 92 is switched on. In this case, the first PNP transistor 99 is set in a conducting condition, and a controlled current having a changeable value (Vcc−Vc)/Rd flows through the third PNP transistor 101 and the discharging resistor 94. That is, a dropped voltage at the discharging resistor 94 having a resistance value Rd is equal to Vcc−Vc. Also, because the combined unit of the PNP transistors 100, 101 functions as a current mirror circuit, the signal current having the same value (Vcc−Vc)/Rd flows through the second PNP transistor 100 and the first NPN transistor 102. Because the size of the second NPN transistor 103 is twice as large as that of the first NPN transistor 102, a discharging current having a changeable value Id=2*(Vcc−Vc)/Rd flows through the second NPN transistor 103. Also, a changeable value Ic of the charging current flowing through the charging resistor 72 is equal to (Vcc−Vc)/Rc. Therefore, a capacitor current discharged from the capacitor element 15 is proportional to a difference between the source voltage Vcc and the capacitor voltage Vc, and the discharging time-variation of the capacitor voltage Vc at the capacitor element 15 is expressed according to an equation (18) in the same manner as in equation (15).

$$(Vcc-Vc)/Rc-(Vcc-Vc)/Rd=C*dVc/dt \quad (18)$$

The discharging time-variation of the capacitor voltage Vc is formed in an exponential curve shape having an upward peak as shown in FIG. 11, and the linearity of a charging-discharging time ratio t1/t2 to a resistance ratio Rc/Rd is maintained in the same manner as that in the charging and discharging integration circuit 59.

Accordingly, because any current mirror circuit used for the charging operation is not arranged on the charging line Lc in the same manner as in the first embodiment, even though the changeable value Ic of the charging current is lowered to lengthen the charging time t1, there is no possibility that the changeable value Ic of the charging current will fluctuate. Therefore, the charging and discharging operation in the charging and discharging integration circuit 63 can be performed with high accuracy even though the capacitance C of the capacitor element 15 is reduced when that the charging-discharging time ratio t1/t2 is high.

Also, because one end of the capacitor element 15 is earthed in the same manner as in the first embodiment, the capacitor element 15 can be reset to have no electric charge by continuing the discharge of the capacitor element 15 through the discharging line Ld.

Also, because the number of external terminals in the charging and discharging integration circuit 63 is only four, even though a dual inline package is required as an IC package in the conventional charging and discharging integration circuit 11 or 41, a single inline package can be utilized as the IC package 91. Therefore, an arranging space required to arrange the charging and discharging integration circuit 63 can be considerably reduced.

Having illustrated and described the principles of our invention in a preferred embodiment thereof, it should be readily apparent to those skilled in the art that the invention can be modified in arrangement and detail without departing from such principles. We claim all modifications coming within the spirit and scope of the accompanying claims.

What is claimed is:

1. A charging and discharging integration circuit, comprising:

a capacitor element;

an electric source for charging said capacitor element;

a charging resistor arranged in a charging line between said electric source and said capacitor element;

a current limiting circuit, arranged in a discharging line from which an electric charge of said capacitor element is discharged, for adjusting a value of a passing current according to an external signal;

a switching circuit for exchanging said capacitor element between a discharging condition and a charging condition; and a current limit controlling circuit for providing said external signal to said current limiting circuit to discharge said capacitor element in a curved voltage decreasing waveform corresponding to a voltage increasing waveform of said capacitor element when charging through said charging resistor.

2. A charging and discharging integration circuit according to claim 1, wherein:

said current limit controlling circuit provides said external signal to said current limiting circuit so as to decrease a voltage of said capacitor element in an exponential curved shape having an upper peak in a higher voltage direction.

3. A charging and discharging integration circuit according to claim 2, wherein:

said current limit controlling circuit provides said external signal for said current limiting circuit so as to pass a current proportional to a difference voltage between a voltage of said capacitor element and a voltage of said electric source through said current limiting circuit.

4. A charging and discharging integration circuit according to claim 3, wherein said current limit controlling circuit comprises:

a discharging resistor;

a current limit driving circuit, connected to said discharging resistor in series and making a passing current value adjustable, for providing said external signal to said current limiting circuit; and a comparing circuit for controlling said passing current value of said current limit driving circuit so as to equalize a divided voltage divided by said discharging resistor and said current limit driving circuit with a voltage of said capacitor element.

5. A charging and discharging integration circuit according to claim 4, wherein:

said current limiting circuit, said switching circuit, said current limit driving circuit and said comparing circuit are packaged as a circuit unit by exposing only a plurality of external terminals; and said charging and discharging integration circuit further comprises:

a first external terminal to which a positive side of said electric source, a first end of said charging resistor and a first end of said discharging resistor are connected, a second external terminal to which a second end of said capacitor element and a second end of said charging resistor are connected, a third external terminal to which a second end of said discharging resistor is connected, and a fourth external terminal to which a negative side of said electric source is connected.

6. A charging and discharging integration circuit according to claim 5, wherein:

said switching circuit has a switch only for switching said discharging line of said capacitor element.

7. A charging and discharging integration circuit according to claim 3 wherein said current limit controlling circuit comprises:

a discharging resistor; and a current limit driving circuit, connected to said discharging resistor in series, for providing said external signal according to a current flowing through said discharging resistor to said current limiting circuit.

8. A charging and discharging integration circuit according to claim 7, wherein:

said current limiting circuit, said switching circuit and said current limit driving circuit are packaged as a circuit unit by exposing only a plurality of external terminals; and said charging and discharging integration circuit further comprises:

a first external terminal to which a positive side of said electric source and a first end of said charging resistor are connected, a second external terminal to which a first end of said discharging resistor is connected, a third external terminal to which said capacitor element, a second end of said charging resistor and a second end of said discharging resistor are connected, and a fourth external terminal to which a negative side of said electric source is connected.

9. A charging and discharging integration circuit according to claim 8, wherein:

said switching circuit has a switch only for switching a current passing line from said electric source to said discharging resistor.

10. A charging and discharging integration circuit according to claim 1, further comprising;

a discharging resistor connected to said current limit controlling circuit for adjusting a discharging current from said capacitor element.

11. A charging and discharging integration circuit according to claim 10, wherein:

said current limiting circuit, said switching circuit and said current limit controlling circuit are packaged as a circuit unit by exposing only a plurality of external terminals, and said capacitor element and said charging resistor are connected directly in series outside said packaged circuit unit; and said packaged circuit unit comprises:

a first external terminal to which a positive side of said electric source is connected, a second external terminal to which said discharging resistor is connected, a third external terminal to which said capacitor element is connected, and a fourth external terminal to which a negative side of said electric source is connected.

12. A charging and discharging integration circuit according to claim 1, wherein:

said current limiting circuit, said switching circuit and said current limit controlling circuit are packaged as a circuit unit by exposing only a plurality of external terminals, and said capacitor element and said charging resistor are connected directly in series outside said packaged circuit unit, said packaged circuit unit comprises:

a first external terminal to which a positive side of said electric source is connected, a second external terminal to which said capacitor element is connected, and a third external terminal to which a negative side of said electric source is connected.

13. A charging and discharging integration circuit according to claim 1, wherein:

said charging and discharging integration circuit is exchanged between a charge and a discharge in response to a rotational positioning signal output from a rotational angular detector of an internal combustion engine.

14. A circuit unit packaged and utilized for a charging and discharging integration circuit in which signal intervals are integrated by exchanging a capacitor element between charging and discharging, said circuit unit comprising:

a first external terminal to which a positive side of an electric source and a first end of a charging resistor are connected;

a second external terminal to which a discharging resistor is connected;

a third external terminal to which said capacitor element and a second end of said charging resistor are connected;

a fourth external terminal to which a negative side of said electric source is connected;

a current limiting circuit arranged between said third external terminal and said fourth external terminal for adjusting a value of a passing current according to an external signal; and a current limit controlling circuit connected to said second external terminal for providing said external signal to said current limiting circuit so as to decrease a voltage of said capacitor element in an exponential functional waveform according to said discharging resistor connected to said second external terminal.

15. A circuit unit according to claim 14, wherein said current limit controlling circuit comprises:

a current limit driving circuit, connected to said second external terminal and making a passing current value adjustable, for providing said external signal to said current limiting circuit; and a comparing circuit for controlling said passing current value of said current limit driving circuit so as to equalize a divided voltage divided by said discharging resistor and said current limit driving circuit with a voltage of said capacitor element.

16. A circuit unit according to claim 15, wherein:

said packaged circuit unit is exchanged between charging and discharging in response to a rotational positioning signal output from a rotational angular detector of an internal combustion engine.

17. A circuit unit according to claim 14, wherein said current limit controlling circuit comprises:

a current limit driving circuit, connected to said second external terminal, for providing said external signal according to a current flowing through said discharging resistor to said current limiting circuit.

18. A circuit unit according to claim 17, wherein:

said packaged circuit unit is exchanged between charging and discharging in response to a rotational positioning signal output from a rotational angular detector of an internal combustion engine.

* * * * *